(12) United States Patent
Gärdenfors et al.

(10) Patent No.: US 9,619,131 B2
(45) Date of Patent: Apr. 11, 2017

(54) METHODS AND DEVICES FOR DISPLAYING CONTENT

(71) Applicant: BlackBerry Limited, Waterloo (CA)

(72) Inventors: Dan Zacharias Gärdenfors, Malmö (SE); Per Åke Daniel Johansson, Malmö (SE); Nils Roger Andersson Reimer, Malmö (SE); Daniel Tobias Rydenhag, Gothenburg (SE)

(73) Assignee: BlackBerry Limited, Waterloo, Ontario (CA)

( * ) Notice: Subject to any disclaimer, the term of this patent is extended or adjusted under 35 U.S.C. 154(b) by 447 days.

(21) Appl. No.: 13/774,732

(22) Filed: Feb. 22, 2013

(65) Prior Publication Data

US 2014/0245213 A1    Aug. 28, 2014

(51) Int. Cl.
G06F 3/0485 (2013.01)
H04L 12/58 (2006.01)
G06F 3/14 (2006.01)

(52) U.S. Cl.
CPC .......... *G06F 3/0485* (2013.01); *H04L 51/066* (2013.01); *G06F 3/1423* (2013.01); *H04L 51/14* (2013.01)

(58) Field of Classification Search
None
See application file for complete search history.

(56) References Cited

U.S. PATENT DOCUMENTS

| | | | |
|---|---|---|---|
| 6,633,759 B1 * | 10/2003 | Kobayashi | 455/419 |
| 7,647,550 B1 | 1/2010 | Nguyen | |
| 8,730,269 B2 * | 5/2014 | Pinto et al. | 345/684 |
| 8,850,045 B2 * | 9/2014 | Berg et al. | 709/229 |
| 8,863,237 B2 * | 10/2014 | Pahlavan et al. | 726/3 |
| 8,910,061 B2 * | 12/2014 | Reeves et al. | 715/761 |
| 2002/0151283 A1 * | 10/2002 | Pallakoff | 455/90 |
| 2004/0113952 A1 * | 6/2004 | Randall | 345/830 |
| 2005/0083642 A1 * | 4/2005 | Senpuku et al. | 361/681 |
| 2005/0190280 A1 | 9/2005 | Haas et al. | |
| 2006/0095424 A1 | 5/2006 | Petropoulos et al. | |
| 2006/0136828 A1 * | 6/2006 | Asano | 715/733 |
| 2006/0242278 A1 * | 10/2006 | Hawkins | 709/221 |
| 2007/0073833 A1 | 3/2007 | Roy et al. | |
| 2008/0282179 A1 | 11/2008 | Kim et al. | |

(Continued)

OTHER PUBLICATIONS

"[Dual View] Output Preview Window to Other Display," retrieved from the internet: URL: http://www.lwks.com/index.php?option=com_kunena&func=func=view&catid=12&id=11278&limit=6&limitstart=12&Itemid=81 on Jan. 22, 2013; 3 pages.

(Continued)

*Primary Examiner* — Stella E Higgs

(74) *Attorney, Agent, or Firm* — Jon Gibbons; Fleit Gibbons Gutman Bongini & Bianco P.L.

(57) ABSTRACT

Methods and devices for navigating lists of items using multiple displays are described. An example method is implemented on an electronic device having a first display. The method includes displaying a list of items on the first display, at least one of the list of items having respective associated content not visible in the displayed list of items; and while displaying the list of items on the first display, sending the associated content for one or more of the at least one item to a second display for display on the second display.

16 Claims, 8 Drawing Sheets

(56) References Cited

U.S. PATENT DOCUMENTS

| | | | | |
|---|---|---|---|---|
| 2009/0064020 | A1* | 3/2009 | Morris | 715/765 |
| 2009/0213032 | A1* | 8/2009 | Newport et al. | 345/1.1 |
| 2009/0319911 | A1* | 12/2009 | McCann et al. | 715/752 |
| 2010/0064228 | A1* | 3/2010 | Tsern | G06F 3/1415 715/740 |
| 2010/0095239 | A1* | 4/2010 | McCommons | G11B 27/036 715/784 |
| 2010/0259562 | A1* | 10/2010 | Miyazawa et al. | 345/684 |
| 2010/0271288 | A1* | 10/2010 | Srinivasan et al. | 345/2.2 |
| 2011/0096014 | A1* | 4/2011 | Fuyuno et al. | 345/173 |
| 2011/0193806 | A1* | 8/2011 | Kim et al. | 345/173 |
| 2011/0246904 | A1* | 10/2011 | Pinto et al. | 715/740 |
| 2012/0089992 | A1* | 4/2012 | Reeves et al. | 719/318 |
| 2012/0172088 | A1* | 7/2012 | Kirch et al. | 455/557 |
| 2012/0209595 | A1* | 8/2012 | Hokuchi | 704/10 |
| 2013/0019183 | A1* | 1/2013 | Reeves et al. | 715/745 |
| 2013/0076594 | A1* | 3/2013 | Sirpal et al. | 345/1.3 |
| 2014/0103104 | A1* | 4/2014 | Jover | 235/375 |

OTHER PUBLICATIONS

"Davinci Resolve UI question—secondary display," retrieved from the internet: URL: http://www.philipbloom.net/forum/threads/davinci-resolve-ui-question-secondary-display.2256/ on Jan. 22, 2013; 4 pages.

"Dual Monitor—How to get full screen preview on the correct monitor," retrieved from the internet: URL: http://www.elementsvillage.com/forums/showthread.php?t=58472 on Jan. 22, 2013; 4 pages.

"How to Geek," retrieved from the internet: URL: http://www.howtogeek.com/howto/15395/preview-links-and-images-in-google-chrome/ on Jan. 22, 2013; 6 pages.

U.S. Appl. No. 13/401,593, filed Feb. 21, 2012; 49 pages.

PCT/US2012/022684 application filed on Jan. 26, 2012; 75 pages.

PCT/IB2012/050367 application filed on Jan. 26, 2012; 56 pages.

PCT/CA2012/050332 application filed on May 18, 2012; 46 pages.

Extended European Search Report from related European Patent Application No. 13156474.2 dated Aug. 5, 2013; 6 pages.

* cited by examiner

METHODS AND DEVICES FOR DISPLAYING CONTENT

TECHNICAL FIELD

The present disclosure relates to content navigation and, more particularly, to methods and devices for displaying content using multiple displays.

BACKGROUND

Electronic devices are available in many different shapes and sizes, each of which may be best suited for a specific task or specific set of tasks. For example, laptop computers, smartphones, desktop computers, tablet computers may each have hardware and software which enables them to perform a specific task or a specific set of tasks. Due to hardware and software constraints, some of those electronic devices may not be capable or may not be best suited for performing a particular task. For example, since smart phones are generally designed to be highly portable, such electronic devices are often equipped with a small display and may, therefore, not be best suited for displaying and navigating content.

In some circumstances, a user may wish to navigate or browse content but may find that the electronic device which they are using is limited in its ability to display detailed content due to a small display size, or other restrictions on the graphical user interface functionality. In the case of lists of items, the electronic device may only be able to display a small amount of information about each item. To see more detailed content associated with each item it may be necessary to select and open each item in turn until a desired item is found. When navigating a lengthy list, this may be a cumbersome approach.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present application describes a method in an electronic device. The electronic device has a first display. The method includes displaying a list of items on the first display, at least one of the items of the list of items having respective associated content not visible in the displayed list of items; and while displaying the list of items on the first display, sending the associated content for one or more of the at least one item to a second display for display on the second display.

In another aspect, the present application describes an electronic device. The electronic device has a first display, an input interface, a communication subsystem and a memory. The electronic device also has a processor coupled to the display, the input interface, the communication subsystem and the memory. The processor is configured to display a list of items on the first display, at least one of the items of the list of items having respective associated content not visible in the displayed list of items; and while displaying the list of items on the first display, send the associated content for one or more of the at least one item to a second display for display on the second display.

In yet another aspect, the present application describes a non-transitory computer-readable storage medium. The non-transitory computer-readable storage medium includes computer executable instructions which, when executed, configure a processor to display a list of items on a first display of an electronic device, at least one of the items of the list of items having respective associated content not visible in the displayed list of items; and while displaying the list of items on the first display, send the associated content for one or more of the at least one item to a second display for display on the second display.

Other example embodiments of the present disclosure will be apparent to those of ordinary skill in the art from a review of the following detailed descriptions in conjunction with the drawings.

Example embodiments of the present disclosure are not limited to any particular operating system, electronic device architecture, server architecture or computer programming language.

Example Communication System

Figure 1:
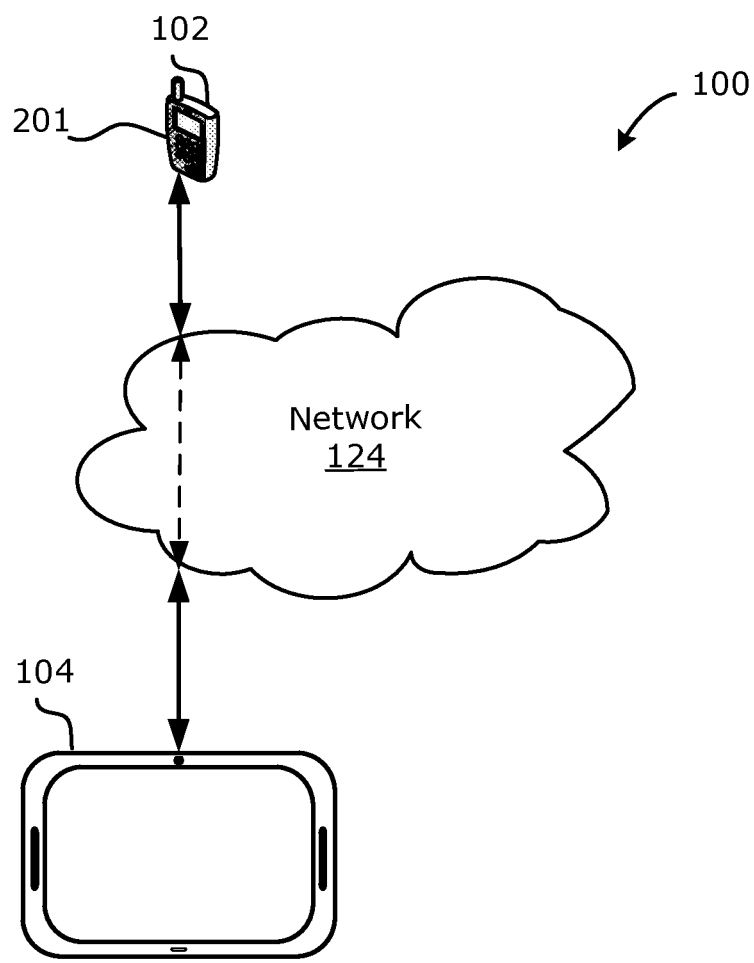
FIG. 1 is a block diagram of an example communication system.

Reference will now be made to FIG. 1 which illustrates an example communication system 100. The communication system 100 is configured to allow a first electronic device 102 to send content to a second electronic device 104 for display as a preview. That is, the first electronic device 102 displays a list of items with each item having respective associated content, and sends the associated content for the one or more of the displayed items to the second electronic device 104 for display as a preview. Accordingly, a user of the electronic devices is able to view the list of items on one of the devices (for example, the first electronic device 102), while simultaneously viewing previews of the content associated with one or more of the items on the other device (for example, the second electronic device 104).

In the example embodiment illustrated, the first electronic device 102 is a mobile communication device 201. More specifically, in the example embodiment illustrated, the first electronic device 102 is a smartphone. However, in other example embodiments, the first electronic device 102 may take other forms. For example, in some example embodiments, the first electronic device 102 may be a tablet computer, a wearable computer such as a watch, a notebook, a notepad or a laptop computer, a desktop computer, or a television. The first electronic device 102 may take other forms apart from those specifically listed herein.

Similarly, in the example embodiment illustrated, the second electronic device 104 is illustrated as a tablet computer. However, the second electronic device 104 may take other forms. By way of example, the second electronic device 104 may be a notebook, notepad or a laptop computer, a desktop computer, a smartphone or other mobile communication device, a wearable computer such as a watch, a television, or a mobile communication device. Additionally, in at least some example embodiments, the second electronic device may be a "passive" electronic device (i.e. it may operate as a peripheral device under command and control of the first electronic device 102). For example, the second electronic device may be a computer monitor or display screen.

The first electronic device 102 and the second electronic device 104 are communicatively connected to one another. That is, the first electronic device 102 and the second electronic device 104 are each equipped with one or more communication subsystems which allow these electronic devices to communicate with one another. In the example embodiment of FIG. 1, the first electronic device 102 and the second electronic device 104 communicate via a network 124. The network 124 may include a private network, and/or a public network, such as the Internet. For example, in some example embodiments, the first electronic device 102 and/or the second electronic device 104 are configured for Wi-Fi communications with respective network gateways.

In other example embodiments, the network 124 may not be utilized. Instead, the first electronic device 102 may connect to the second electronic device 104 via a more direct wireless connection. For example, in some example embodiments, the first electronic device 102 may connect directly to the second electronic device 104 via Wi-Fi communications. Similarly, in at least some example embodiments, the first electronic device 102 may connect to the second electronic device 104 via a Bluetooth™ connection. Similarly, in at least some example embodiments, the first electronic device 102 may connect to the second electronic device 104 via a near field communication (NFC) connection. Accordingly, in at least some example embodiments, the first electronic device 102 may be configured to communicate with the second electronic device 104 via a short range communication technology. That is, a short range connection may be established between the first electronic device 102 and the second electronic device 104. Additionally, in at least some example embodiments, the first electronic device 102 and the second electronic device 104 may connect via a wired communication link, such as a Universal Serial Bus (USB) or Ethernet connection.

In some example embodiments, after a connection is established between the first electronic device 102 and the second electronic device 104, the first electronic device 102 may send content to the second electronic device 104. As will be discussed in greater detail below with reference to FIG. 4, in such example embodiments, the first electronic device 102 may display a list of items on a first display with each item of the list items having respective associated content that is not visible in the displayed list of items. While displaying the list of items, the first electronic device 102 sends the content associated with one or more of the displayed items to the second electronic device 104 for display as a preview. For example, the first electronic device 102 may display a list of email message identifiers with each email message identifier being associated with a body of an email message that is not visible with the displayed list of email message identifiers. The bodies of one or more of the displayed email messages are sent to the second electronic device 104, and at least some of that content is displayed as a preview on the second electronic device 104. In this manner, a user is able to view the list of email message identifiers on one display (i.e. the first display), while being able to view the associated previews of the bodies of the email messages on the other display (i.e. the second display) at the same time.

It will be appreciated that in at least some example embodiments, the second electronic device 104 may perform some of the features discussed above with reference to the first electronic device 102. For example, the first electronic device 102 may display the list of items and the second electronic device 104 may obtain the content associated with one or more of the displayed items for display as a preview on the second electronic device 104 (for example, by retrieving the content from the first electronic device 102).

Example First Electronic Device

An overview having been provided, reference will now be made to FIG. 2, which illustrates an example first electronic device 102. In the illustrated example embodiment, the first electronic device 102 is a mobile communication device 201. In at least some example embodiments, the mobile communication device 201 is a two-way communication device having data and possibly voice communication capabilities, and the capability to communicate with other computer systems; for example, via the internet. Depending on the functionality provided by the first electronic device 102, in various example embodiments the first electronic device 102 may be a multi-mode communication device configured for both data and voice communication, a mobile telephone such as a smartphone, a tablet computer such as a slate computer, a wearable computer such as a watch, a PDA (personal digital assistant), a computer system such as a desktop, netbook, laptop, or notebook computer system.

In other example embodiments, the first electronic device 102 may be of a type not specifically listed above.

Figure 2:
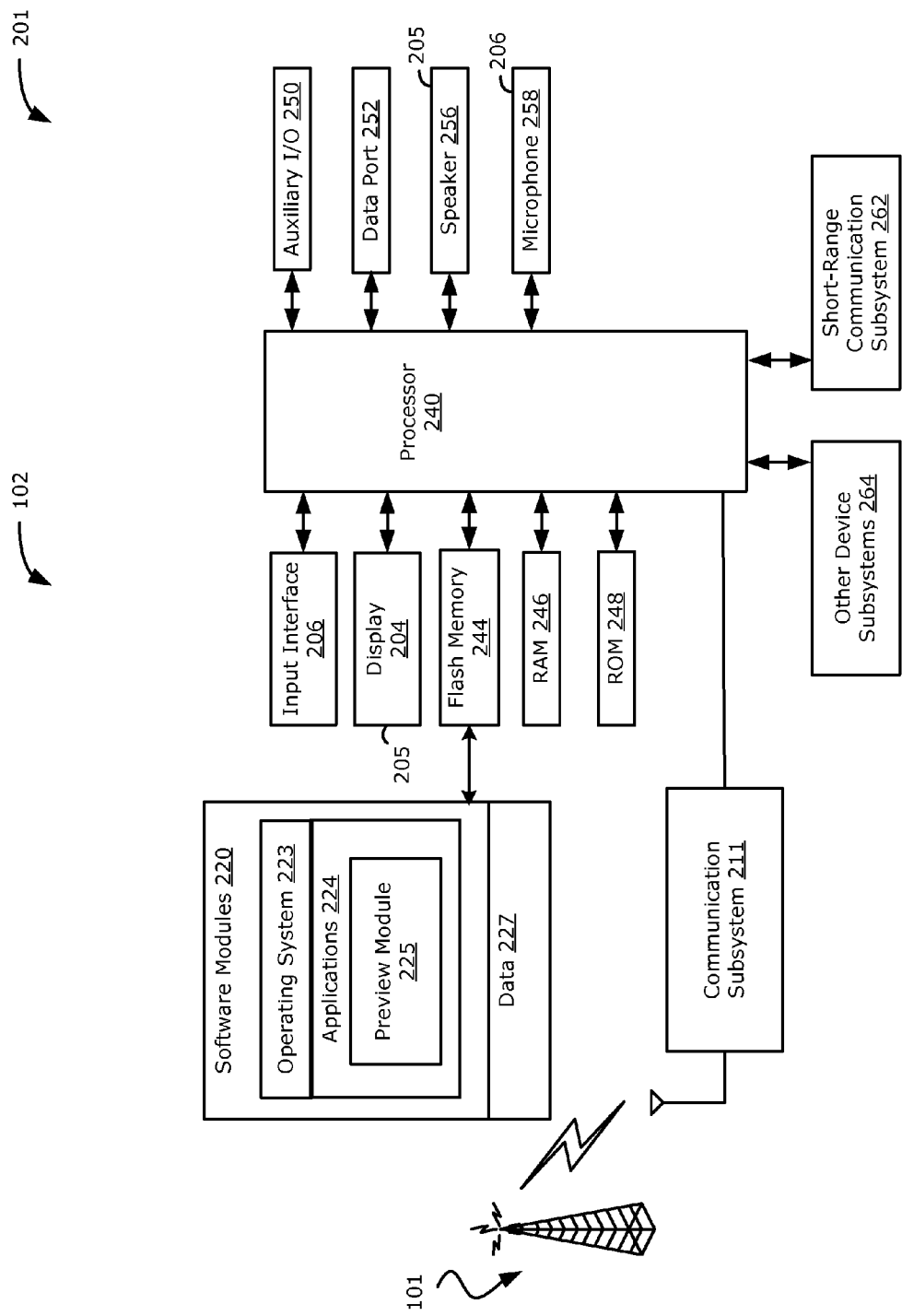
FIG. 2 is a block diagram of an example first electronic device.

The mobile communication device 201 of FIG. 2 includes a housing (not shown) which houses components of the mobile communication device 201. The internal components of the mobile communication device 201 are constructed on a printed circuit board (PCB). The mobile communication device 201 includes a controller including at least one processor 240 (such as a microprocessor) which controls the overall operation of the mobile communication device 201. It will be appreciated that, in at least some example embodiments, the controller may, instead of or in addition to the processor 240, include an analog circuit or other types of circuits capable of performing a part or all of the functions of the processor 240 that are described herein. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a first display 204 (which may be a liquid crystal display (LCD)), one or more speakers 256, or other output interfaces 205), a short-range communication subsystem 262, and other device subsystems generally designated as 264. Some of the subsystems shown in FIG. 2 perform communication-related functions, whereas other subsystems may provide "resident" or on-device functions.

The mobile communication device 201 may include a touchscreen display in some example embodiments. The touchscreen display may be constructed using a touch-sensitive input surface connected to an electronic controller. The touch-sensitive input surface overlays the first display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The mobile communication device 201 is connected to a communication network such as a wireless network 101 which may include one or more of a Wireless Wide Area Network (WWAN) and a Wireless Local Area Network (WLAN) or other suitable network arrangements. In at least some example embodiments, the mobile communication device 201 is configured to communicate over both the WWAN and WLAN, and to roam between these networks. In at least some example embodiments, the wireless network 101 may include multiple WWANs and WLANs.

The mobile communication device 201 may store data 227 in an erasable persistent memory, which in one example embodiment is the flash memory 244. In various example embodiments, the data 227 may include service data having information required by the mobile communication device 201 to establish and maintain communication with the wireless network 101. The data 227 may also include user application data such as email messages, address book and contact information, calendar and schedule information, notepad documents, image files, and other commonly stored user information stored on the mobile communication device 201 by its user, and other data. The data 227 stored in the persistent memory (e.g. flash memory 244) of the mobile communication device 201 may be organized, at least partially, into a number of databases or data stores each containing data items of the same data type or associated with the same application. For example, email messages, contact records, and task items may be stored in individual databases within the memory of the mobile communication device 201.

The short-range communication subsystem 262 is an additional optional component which provides for communication between the mobile communication device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices. In some embodiments, the mobile communication device 201 may be connected to the second electronic device 104 (FIG. 1) via the short-range communication subsystem 262.

A predetermined set of applications that control basic device operations, including data and possibly voice communication applications may be installed on the mobile communication device 201 during or after manufacture. Additional applications and/or upgrades to an operating system 222 or software applications 224 may also be loaded onto the mobile communication device 201 through the wireless network 101, the auxiliary I/O subsystem 250, the data port 252, the short-range communication subsystem 262, or other suitable device subsystems 264. The downloaded programs or code modules may be permanently installed; for example, written into the program memory (e.g. the flash memory 244), or written into and executed from the RAM 246 for execution by the processor 240 at runtime.

The processor 240 operates under stored program control and executes software modules 220 stored in memory such as persistent memory; for example, in the flash memory 244. As illustrated in FIG. 2, the software modules 220 may include operating system software 222 and one or more additional applications 224 or modules such as, for example, a preview module 225. For ease of illustration, in the example embodiment of FIG. 2, the preview module 225 is illustrated as being implemented as a separate stand-alone application 224, but in other example embodiments, this module could be implemented as part of the operating system 222 or another application 224.

The mobile communication device 201 may include a range of additional software applications 224, including, for example, a contact manager application, an image application, an email application, a notepad application, voice communication (i.e. telephony) application, mapping application, a media player application, or any combination thereof. Each of the software applications 224 may include layout information defining the placement of particular fields and graphic elements (e.g. text fields, input fields, icons, etc.) in the user interface (i.e. on the first display 204) according to the application.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

The operating system 222 is software that manages mobile communication device 201 components (such as the first display 204, input interface 206, wireless communication subsystem 211, etc.) and provides a platform for software applications 224. The operating system 222 may act as an intermediary between the mobile communication device 201 components and the software applications 224. For example, the operating system 222 may recognize data that is being input from a navigational input device and route the inputted data to be executed by a software application 224.

The operating system 222 may be configured to establish a connection between the first electronic device 102 and the second electronic device 104. That is, the operating system 222 is capable of establishing a form of connection between devices so that they can communicate with one another. In at least some example embodiments, the connection may be established wirelessly or non-wirelessly. In at least some example embodiments, the connection may be established by a pairing process which creates a trusted relationship between the first electronic device 102 and the second electronic device 104. In at least some example embodiments, during the pairing process, the operating system 222 may create and store trusted relationship information (for example, user IDs and security keys) that may be retrieved and used to automatically maintain connections between the first electronic device 102 and the second electronic device 104 without having to re-start the pairing process during each connection session.

As noted above, the preview module 225 may be configured to send content to the second electronic device 104 (FIG. 1) for display as a preview. For example, in at least some example embodiments, after a connection is established between the first electronic device 102 and the second electronic device 104, the first electronic device 102 may display a list of items on the first display 204 (such as, an email list, a contact list, an image list, etc.). Each of the items of the list of items is associated with content that is not visible in the displayed list of items (for example, for an email list each item may be an email message identifier and the associated content is a body of an email message; for a contact list each item may be a contact identifier and the associated content is a contact record; for an image list each item may be a thumbnail and the associated content is the full-size image, etc.). That is, each item of the list may be linked to (associated with) content that is not displayed or easily visible in the list of items. While displaying the list of items on the first display 204, the preview module 225 sends the content associated with one or more of the displayed items to the second electronic device 104 for display on a second display as a preview (in at least some example embodiments, the preview may include at least a portion of the associated content). That is, the associated content is automatically sent to the second electronic device 104 (i.e. without any further action or interaction by a user on the first electronic device 102), and the second electronic device 104 displays the associated content as a preview on the second display. For example, in at least some example embodiments, the sending is based on identifying the one or more items being displayed on the first display 204 and is not conditional on user selection of the one or more items.

Accordingly, a user may simultaneously view the list of items on the first display 204 and the previews of the content associated with the displayed items on a second display on the second electronic device 104. In at least some example embodiments, in order to facilitate viewing of the displayed items and the previews, the preview module 225 displays a graphical cue to indicate an association between a displayed item in the list of items and a corresponding preview. For example, a different colour effect may be applied to each displayed item that matches to a colour effect of the corresponding previews.

It will be appreciated that as the first electronic device 102 sends the associated content of one or more of the items to the second electronic device 104, the second electronic device 104 may display the corresponding previews of all or some of the displayed items on the first display 204. That is, in at least some example embodiments, the first electronic device 102 may send the content associated with all of the displayed items. In such cases, the second electronic device 104 may display the corresponding previews of all of the items. However, in other example embodiments, the first electronic device 102 may send the content associated with a subset of the displayed items. In such cases, the second electronic device 104 may display the corresponding previews of only those items.

In at least some example embodiments, navigating functions may be performed on the displayed list of items that result in synchronized navigating operations being performed on the displayed previews. For example, in at least some example embodiments, the list of items displayed on the first display 204 is a subset of a scrollable list of items. In such example embodiments, the first electronic device 102 may receive, via the input interface 206, a scrolling command to scroll the scrollable list of items. In response to receiving the scrolling command, the first electronic device 102 scrolls the scrollable list of items. Additionally, while the scrollable list of items is being scrolled, the preview module 225 initiates scrolling of the corresponding previews of the content associated with one or more scrolled items on the second display (for example, by sending an instruction to the second electronic device 104). Accordingly, the scrolling of the list of items is synchronized with the scrolling of the corresponding previews.

In at least some example embodiments, in order to facilitate smooth navigation, the preview module 225 may determine what associated content to send to the second electronic device 104 based on characteristics of the scrolling. If the scrolling is particularly fast, it may be difficult to send full associated content for each item to the second electronic device 104 in time for the second electronic device 104 to display and scroll a preview in a synchronized manner. Moreover, it may be unnecessary to display full previews if items are being scrolled quickly. In at least some example embodiments, scrolling of the scrollable list of items may include determining a rate of scrolling of the scrollable list of items. The sending of preview content for items being scrolled onto the first display 204 may be conditional on determining that the rate of scrolling is less than a predetermined threshold (i.e. the scrollable list of items are determined not to be scrolled at a "fast" speed due to the detected scrolling command). In such example embodiments, when the scrolling speed is below the threshold, the content associated with the one or more scrolled items being scrolled onto the first display 204 is sent to the electronic device 104 for display on the second display as a preview. Accordingly, the preview module 225 may assess the scrolling speed of the scrollable list of items prior to sending the associated content for display on the second electronic device 104 as a preview (as too "fast" scrolling and simultaneous sending of content to the second electronic device 104 for display may result in visual noise when the second electronic device 104 attempts to display the corresponding previews). In some embodiments, when the scrolling speed is above the threshold, the second electronic device 10 may display "blank" or "placeholder" previews that are scrolled correspondingly quickly on the second display to give the effect of synchronized scrolling, although the previews may not contain the actual associated content of those items. Once the scrolling speed drops below the threshold, then the second electronic device 104 begins displaying actual associated content in the previews again.

Additionally, in at least some example embodiments, in order to provide for a seamless navigation experience during the scrolling operation, the preview module 225 may attempt to anticipate future scrolling and may send associated content with items not yet displayed on the list of items so that the associated content is available at the second electronic device 104 if needed for a preview. In such example embodiments, the second electronic device 104 may include a preview cache for caching associated content received from the first electronic device 102 during the scrolling operation. In at least some example embodiments, after receiving the scrolling command, the first electronic device 102 may send the content associated with one or more scrolled items of the scrollable list of items to the second electronic device 104 for pre-caching. For example, the preview module 225 may calculate which the items from the list of items will be displayed on the first display 204 when the scrolling operation ends based on the received scrolling command (e.g. in the case of a touchscreen embodiment, the prediction may be based upon the speed and distance of the 'swipe' operation). In one embodiment, preview module 225 identifies the items expected to be displayed when the scrolling speed drops below the threshold and the preview module 225 initiates transfer of the associated content for those items to the second electronic device 104 for pre-caching. The received associated content is then cached at the second electronic device 104 and retrieved by the second electronic device 104 for display on the second display as a preview when needed.

The term "preview" as used herein means the display of at least some of the associated content that is not currently visible in on the first display 204. In this sense, it is a preview of what the user would be able to access if the item were "opened" on the first electronic device 102. The preview displayed on the second display may include all of the associated content for an item, or a portion of the associated content for that item. In some embodiments described below, the preview may change as it is displayed. For example, it may initially contain only a portion of the associated content. Over time, if the item is not scrolled away on the first electronic device 102, the preview may be modified to include more of the associated content. The modification may be gradual display of additional detail from the associated content in some embodiments.

Specific functions and features of the operating system 222 and the preview module 225 will be discussed in greater detail below with reference to FIG. 4.

In at least some example embodiments, the operating system 222 may perform some or all of the functions of the preview module 225. In other example embodiments, the functions or a portion of the functions of the operating system 222 and/or the preview module 225 may be performed by one or more other applications. For example, in at least some example embodiments, the pairing process or sending content function may be performed by other applications.

Further, while the preview module 225 has been illustrated as a stand-alone application, in other example embodiments, the preview module 225 may be implemented as part of the operating system 222 or another application 224. Furthermore, in at least some example embodiments, the functions of the preview module 225 may be provided by a plurality of software modules. In at least some example embodiments, these software modules may be divided among multiple applications.

Example Second Electronic Device

Figure 3:
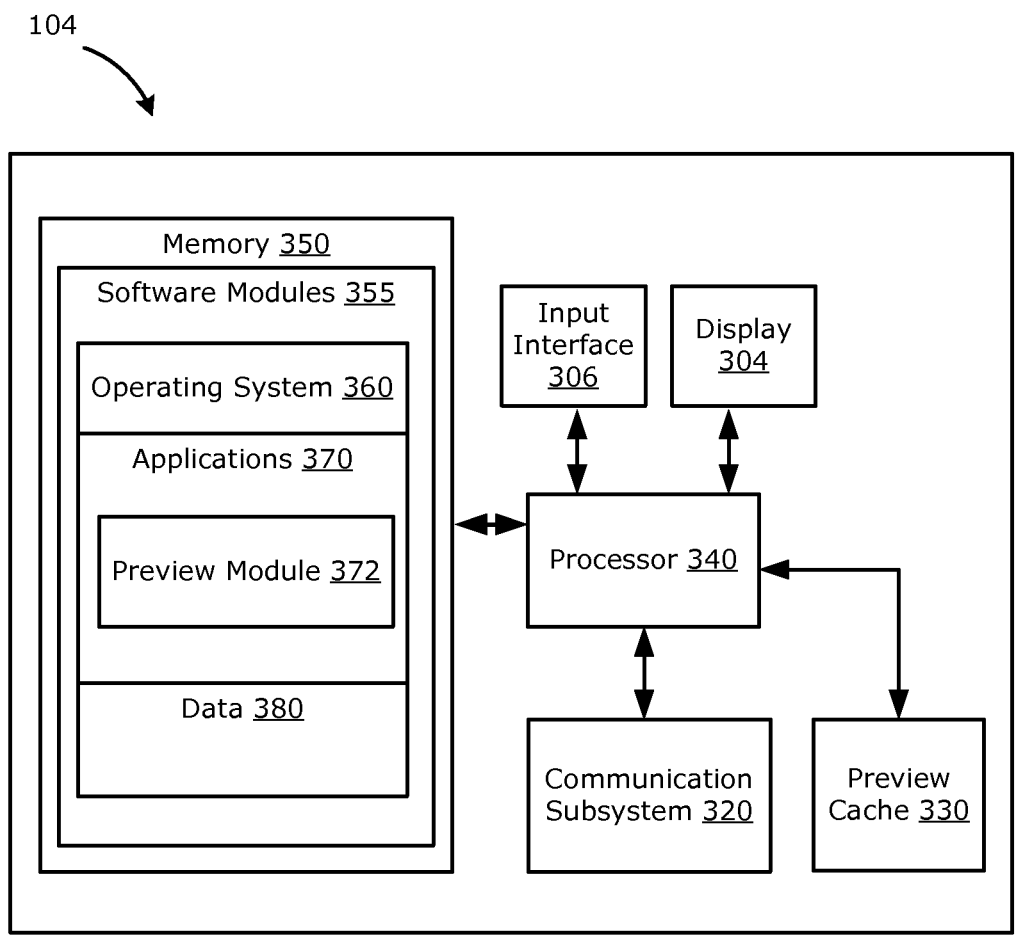
FIG. 3 is a block diagram of an example second electronic device.

Reference is now made to FIG. 3, which shows in block diagram form an example second electronic device 104. The second electronic device 104 is configured to receive content from the first electronic device 102 (of FIGS. 1 and 2) for display as a preview. The second electronic device 104 may display previews of the received content on a second display 304 associated with the second electronic device 104. More particularly, in at least some example embodiments, the second electronic device 104 may display, on the second display 304, previews of content associated with respective items of a list that are displayed on the first display 204 of the first electronic device 102.

The second electronic device 104 may be of a variety of different types. For example, in some example embodiments, the second electronic device 104 is a tablet computer. In other example embodiments, the second electronic device 104 is a notebook, laptop, or netbook style computer. In yet further example embodiments, the second electronic device 104 is a mobile communication device 201 (of FIG. 2), such as a cellular phone, smartphone or other style mobile communication device. For example, in some example embodiments, the second electronic device 104 may be a mobile communication device 201 of the type described above with reference to FIG. 2. In yet further example embodiments, the second electronic device 104 may be a wearable computer, such as a watch. Additionally, in at least some example embodiments, the second electronic device 104 may be a "passive" electronic device, such as a peripheral device like a computer monitor or display screen.

The second electronic device 104 includes a controller, including one or more processors 340 which control the overall operation of the second electronic device 104. The second electronic device 104 may include a memory 350 which is communicatively connected to the processor 340. The memory 350 may be configured to provide data stored in the memory 350 to the processor 340. For example, the memory 350 may include processor readable instructions for causing the processor 340 to perform various operations.

While the memory 350 is illustrated as a single component, it will typically include multiple memory components of various types. For example, the memory 350 may include random access memory (RAM), read only memory (ROM), a hard disk drive (HDD), a solid state drive (SSD), flash memory, or other types of memory. It will be appreciated that each of these various types of memory will be best suited for different purposes and applications.

The second electronic device 104 may include one or more input interfaces 306 (such as a keyboard, one or more control buttons, one or more microphones, and/or a touch-sensitive overlay associated with a touchscreen display). The input interfaces 306 are configured to input instructions and commands to the second electronic device 104 to perform specific tasks and functions. For example, a user may input instructions to establish a connection between the first electronic device 102 and the second electronic device 104.

As mentioned above, the second electronic device 104 includes a second display 304. The second display 304 may be configured to display preview of content received from the first electronic device 102. The input interfaces 306 and the display 304 may be controlled by the processor 340.

The second electronic device 104 may include one or more communication subsystems 320 for communicating with other systems, servers, or electronic devices. In particular, a communication subsystem 320 is provided on the second electronic device 104 to allow the second electronic device 104 to communicate with the first electronic device 102. As described above with reference to FIG. 1, in some example embodiments, the second electronic device 104 may communicate with the first electronic device 102 via a network 124 (of FIG. 1). In other example embodiments, the communication subsystem 320 may allow the second electronic device 104 to communicate more directly with the first electronic device 102. That is, in at least some example embodiments, the first electronic device 102 and the second electronic device 104 may communicate with one another through a direct connection such as a direct wireless connection. In at least some example embodiments, the communication subsystem 320 may be a wireless communication interface such as Wi-Fi or Bluetooth or may be a communication subsystem 320 which is configured to communicate via wired communications, such as Ethernet communications. The communication subsystem 320 may take other forms apart from those specifically listed herein.

In at least some example embodiments, the second electronic device 104 may also include a preview cache 330. The preview cache 330 is a component that temporarily stores content so that the content may be retrieved faster for future access. As will be discussed below, in at least some example embodiments, the preview cache 330 may store content that is received from the first electronic device 102. It will be understood that although the preview cache 330 is shown separately in FIG. 3, it is not necessarily implemented as separate physical memory component and may be implemented as a part of the memory 350 in many embodiments.

The processor 340 may operate under stored program control and may execute software modules 355. The software modules 355 may, in at least some example embodiments, include operating system software 360 and one or more additional applications 370 or modules such as, for example, a preview module 372. The operating system 360 and the preview module 372 may perform similar functions as the operating system 222 (of FIG. 2) and the preview module 225 (of FIG. 2), respectively, of the first electronic device 102.

The preview module 372 may cooperate with the preview module 225 of the first electronic device 102. For example, the preview module 372 may receive the content associated with one or more items of a list of items that is displayed on the first display 204 of the first electronic device 102, and sent from the preview module 225 of the first electronic device 102. The preview module 372 may be configured to then cause display of a preview of the associated content on the second display 304.

Additionally, during scrolling operations performed on the list of items on the first electronic device 102, the preview module 372 may receive an instruction from the preview module 225 of the first electronic device (e.g. initiation of scrolling) to scroll the corresponding previews of the content. That is, as the list of items is scrolled on the first electronic device 102, the preview module 372 scrolls the corresponding previews. Accordingly, the scrolling of the list of items is synchronized with the scrolling of the corresponding previews.

As mentioned above, in at least some example embodiments, in order to allow for seamless navigation and display during scrolling operations, the preview module 372 may pre-cache the content within the preview cache 330. The preview module 372 may have access to the preview cache 330 and may store, retrieve and/or delete content within the preview cache 330. Accordingly, in such example embodiments, the preview module 225 of the first electronic device 102, after detecting the scrolling command, may send the content associated with one or more not-yet-displayed items of the scrollable list of items to the preview module 372 for pre-caching. The preview module 372 receives the sent content and caches the content within the preview cache 330. Accordingly, the associated content may be readily retrieved and displayed by the preview module 372 during the scrolling operation that results in display of new items for which associated content has been cached. This minimizes the appearance of any delay that otherwise might occur due to the time in transferring the content.

It will be appreciated, that the software modules 355 may be logically or physically organized in a manner that is different than the manner illustrated in FIG. 3. By way of example, the features described herein with reference to the operating system 360 and the preview module 372 may be divided or combined into a greater number or lesser number of software modules. For example, functions which are described with reference to a single software application or module may be provided by a plurality of software applications or modules. Similarly, functions which are described with reference to multiple software applications or modules may be provided by a single software application or module. Similarly, in at least some example embodiments, the functions of two or more of these modules may be combined into a single module. Thus, the software modules 355 described with reference to FIG. 3 represent one possible assignment of features to software modules. However, such features may be organized in other ways in other example embodiments. Furthermore, the second electronic device 104 may include other software applications or modules which provide features which are not specifically discussed herein.

Example Method of Previewing Content

Figure 4:
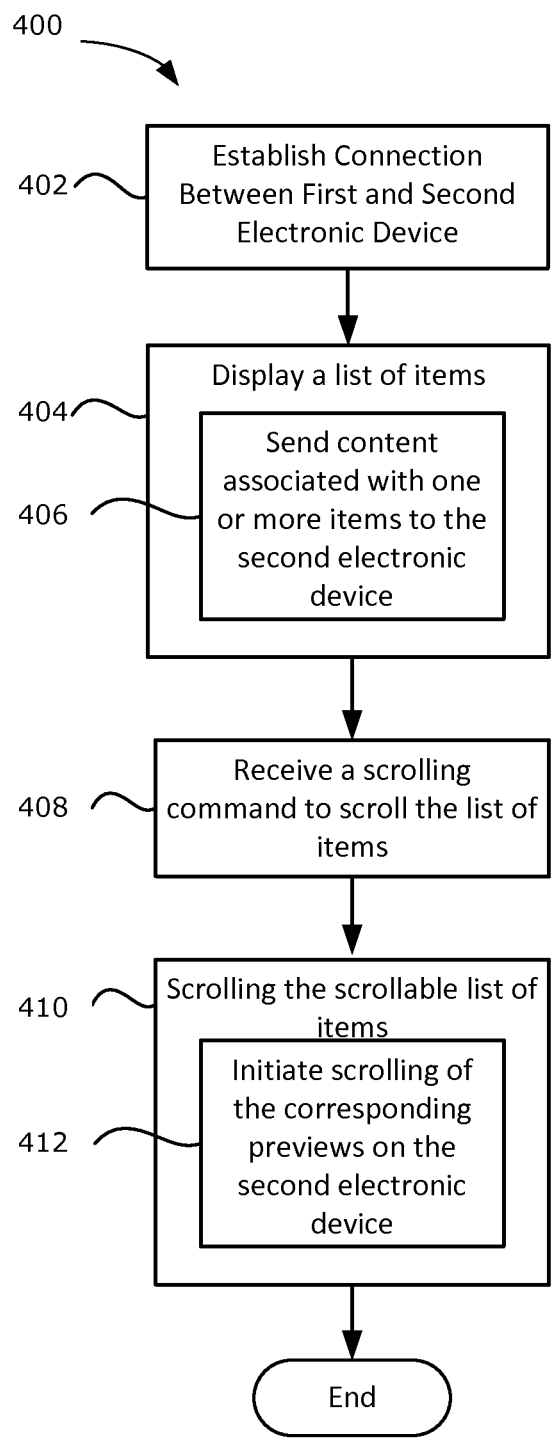
FIG. 4 is flowchart of an example method of sending content to an electronic device for display as a preview.

Reference will now be made to FIG. 4 which illustrates an example method 400 of previewing content on a second electronic device 104. The method 400 includes features which may be provided by the first electronic device 102, such as the mobile communication device 201 of FIG. 2. More particularly, one or more applications or modules associated with the first electronic device 102, such as the operating system software 222 and the preview module 225 (of FIG. 2), may contain processor-readable instructions for causing a processor associated with the first electronic device 102 to perform the method 400 of FIG. 4. That is, in at least some example embodiments, the first electronic device 102 is configured to perform the method 400 of FIG. 4.

In at least some example embodiments, one or more of the features of the method 400 of FIG. 4 may be provided, in whole or in part, by another system, software application, module, or device apart from those specifically listed above. For example, in at least some example embodiments, one or more of the features of the method 400 may be performed, at least in part, by the second electronic device 104 (of FIG. 3).

The method 400 includes, at 402, establishing a connection between the first electronic device 102 and the second electronic device 104. As discussed above, the connection may be a wireless or a wired connection.

At 404, the first electronic device 102 displays a list of items on the first display 204. The list of items includes a plurality of items with each item having respective associated content that is not visible with the displayed list of items on the first display 204. For example, each item of the list of items may be linked to content that is not displayed with the list of items (the linked content may or may not be stored within the first electronic device 102). The list of items may be associated with a variety of applications 224. For example, in at least some example embodiments, the list of items may be associated with an email application. In such example embodiments, the list of items is a list of email message identifiers with each email message identifier being associated with a body of an email message. An email message identifier identifies an email message and may include header information such as a name of the sender/recipient, subject and/or date. Accordingly, the list of email message identifiers is displayed on the first display 204 while the associated email message body for each email message identifier is not displayed on the first display 204. In other embodiments, more or less data may be displayed for each item in the list of email. For example, each item displayed may show a message size, an importance indicator, or other data.

In at least some other example embodiments, the list of items may be associated with a web browser application. The list of items may be a list of webpages, such as a favorites list or a list of search results. For example, the list of items may be a list of search result identifiers with each search result identifier being associated with the corresponding webpage (i.e. the linked content). Accordingly, the list of search result identifiers is displayed on the first display 204 while the associated webpage for each search result identifier is not displayed on the first display 204. It will be appreciated that the list of items may be associated with other applications (such as, a messaging application, an image application, a contact manager application, a social media application, etc.), and the type of data shown in the list of items and the associated content will depend on the particular application.

At 406, while displaying the list of items, the first electronic device 102 sends the content associated with one or more items to the second electronic device 104 for display on the second display 304 as a preview. That is, the content associated with the one or more items is automatically sent to the second electronic device 104 while the one or more items is displayed on the first display 204. In automatically sending the associated content, no further action or interaction is required with the first electronic device 102. For example, a user does not have to input an instruction to cause the first electronic device 102 to send the associated content.

The sending of associated content is based on identifying one or more items being displayed on the first display 204, and is not conditional on user selection of the one or more items. That is, the first electronic device 102 identifies the items that are being displayed on the first display 204 (or a subset of those items), and automatically sends the associated content for the identified items to the second electronic device 104. In at least some example embodiments, the associated content may be stored on the first electronic device 102 (for example, in the memory). However, in at least some example embodiments, the associated content may be stored on another electronic device, system and/or server. Accordingly, the first electronic device 102 may retrieve the associated content from the corresponding storage location and send the associated content to the second electronic device 104 for display as a preview. Alternatively, the first electronic device 102 may send the second electronic device 104 identifiers or links to the associated content and the second electronic device 104 may obtain the associated content itself for displaying the previews.

In embodiments in which the second electronic device 104 is not a peripheral device, i.e. it is an independent device capable of executing processor-readable instructions, the first electronic device 102 may send the associated content and may rely upon the preview module 372 at the second electronic device 104 to manage the display of the previews. In the case where the second electronic device is a passive peripheral device, such as a computer monitor or television, that does not have a preview module 372 configured to manage the display of previews, then the first electronic device 102 may send the associated content by generating and sending the previews for rendering on the display of the second electronic device 104. In such an embodiment, the first electronic device 102, specifically the preview module 225, may manage and control the display of previews on the second electronic device 104.

The preview of the associated content displayed on the second display 304 includes at least a portion of the associated content. That is, the preview displayed may include the complete associated content or a part of the associated content. By displaying the list of items on the first display 204 of the first electronic device 102, and the previews of the content associated with each of the displayed items on the second display 304 of the second electronic device 104, a user may simultaneously view and access the list items and the corresponding previews.

In at least some example embodiments, the displaying of the list of items by the first electronic device 102 may include displaying a graphical cue to indicate an association between an item in the list of items and a corresponding preview. For example, a graphical indicator may be applied to an item displayed on the first display 204 that is also applied to a corresponding preview displayed on the second display 304 to indicate a relationship. In such example embodiments, the second electronic device 104 may apply a similar graphical indicator to the corresponding preview. For example, in at least some example embodiments, a colour effect may be applied to the item and the same colour effect may be applied to the corresponding preview. Similarly, other types of graphical indications may be applied to both the item and the corresponding preview to indicate their association. For example, in at least some example embodiments, background colouring, shading, colour 'halos', boldening effects, sharpening effects, black and white effects, underlining effects, bordering effects, etc. may be applied to the item and the corresponding preview to indicate their association. As there may be a plurality of items and corresponding previews being displayed, in at least some example embodiments, different graphical cues may be applied to an item and corresponding preview pair in order to distinguish the item and corresponding preview pair from other item and corresponding preview pairs. For example, in at least some example embodiments, a displayed item and corresponding preview pair may have a blue colour effect applied while another displayed item and corresponding preview pair may have a red colour effect applied. In another example, the same colour may be applied to each of a series of items, but with progressively darker/lighter shading/tone, and a corresponding progression of shading/tone is applied to the previews. Accordingly, the graphical cues facilitate associating an item with its corresponding preview when viewing or navigating the displays.

As mentioned above, it will be appreciated that as the first electronic device 102 sends the associated content of one or more of the items to the second electronic device 104, the second electronic device 104 may display the corresponding previews of all or some of the displayed items being shown on the first display 204. That is, in at least some example embodiments, the first electronic device 102 may send the content associated with all of the displayed items. In such cases, the second electronic device 104 may display the corresponding previews of all of the items. However, in other example embodiments, the first electronic device 102 may send the content associated with some of the displayed items. In such cases, the second electronic device 104 may display the corresponding previews of only those items (for example, the first electronic device 102 may send the content associated with the first three items of a displayed list of ten items to the second electronic device 104 for display as previews on the second display 304). In yet other embodiments, the first electronic device 102 may send the associated content for all of the items being displayed and, in addition, some items in the list that are not being displayed on the first display (but that may be scrolled into view). The associated content for these additional items may be cached by the second electric device 104 in case it is required later. In some embodiments, the second electronic device 104 does not display a preview for each item for which it has received associated content. For example, the first electronic device 102 may send associated content for all items displayed in the first display (e.g. 10 items) and the second electronic device 104 may display a previews for a subset (e.g. 3 or 4) of those items. Note that in many embodiments the displayed subset that is displayed as previews is not identified based on user selection or highlighting of those items. In one example, the second electronic device 104 displays previews for the subset of items visible at the top of the list in the first display. In another example, the second electronic device 104 displays previews for the subset of items visible in the middle of the list shown in the first display.

In at least some example embodiments, navigation of the displayed list of items on the first electronic device 102 may result in corresponding navigation of the displayed corresponding previews on the second electronic device 104. For example, in at least some example embodiments, the list of items may be a subset of a scrollable list of items. That is, all of the items of the list of items may not be displayable on the first display 204, and the list of items needs to be scrolled in order to display the items that are not being displayed. In such example embodiments, at 408, the first electronic device 102 may receive, via the input interface 206, a scrolling command to scroll the scrollable list of items. For example, a user may perform a swipe gesture on the touchscreen of the first display 204 to input a scrolling command to scroll the scrollable list of items.

In response to receiving the scrolling command, at 410, the first electronic device 102 scrolls the scrollable list of items. That is, the list of items is graphically moved to display items of the list of items that are not currently being displayed.

While scrolling the scrollable list of items, the first electronic device 102, at 412, may initiate scrolling of the corresponding previews of the content associated with the one or more items on the second display 304. For example, the first electronic device 102 may send an instruction to the second electronic device 104 to simultaneously scroll the corresponding previews as the list of items are being scrolled. Accordingly, the scrolling of the list of items causes the corresponding previews to be scrolled instantaneously. For example, if the scrollable list of items is scrolled in a downward direction, the corresponding previews are scrolled in a corresponding direction (depending on the design of the preview display, the corresponding scrolling may be downwards, left, right, etc.).

In order to cause scrolling of the previews, the first electronic device 102 may, in some embodiments, send data regarding the scrolling operation. The data may include a scrolling direction, a scrolling speed, and/or scroll duration. The data may also or alternatively include identifying the items to be displayed at the conclusion of the sculling operation, thereby enabling the second electronic device 104 to prepare to display the corresponding previews. In another embodiment, instead of sending data regarding the scrolling operation itself, the first electronic device 102 may continuously identify the items being displayed on the first display as the scrolling occurs, thereby enabling the second electronic device to display corresponding previews.

As mentioned above, in at least some example embodiments, the first electronic device 102 may determine a rate or speed of scrolling of the scrollable list of items and compare it to a pre-determined threshold. That is, the first electronic device 102 may to determine that a speed of scrolling of the scrollable list of items is greater than a certain pre-defined speed, in which case associated content may not be sent for all items being scrolled through the first display. Instead, the first electronic device 102 may determine, based on the scrolling command input, the area of the list of items that will be visible in the first display when the scrolling speed is expected to drop below the threshold, and the first electronic device 102 may begin sending associated content for those items. The rate of scrolling may be determined based on the scrolling command input by the user of the first electronic device 102 (such as, the nature of the scrolling gesture on the touchscreen of the first display 204 may indicate the rate of scrolling of the scrollable list of items (for example, a rapid swiping gesture may cause a faster rate of scrolling while a slower swiping gesture may cause a slower rate of scrolling)).

As noted previously, in at least some example embodiments, to improve synchronization of the scrolling operations on both electronic devices, the first electronic device 102 may send associated content for items not yet displayed or visible on the first display to the second electronic device 104 for pre-caching in anticipation that they may be scrolled into view in the future. This pre-caching operation may occur prior to receipt of any scrolling command, in some embodiments. In at least some example embodiments, after receiving a scrolling command, the first electronic device 102 may send content associated with a plurality of items of the scrollable list of items that will be (or are likely to be) scrolled into view on the first display to the second electronic device 104 for pre-caching. The first electronic device 102 may determine the items that are viewable (or likely to become viewable) as the list of items are scrolled based on the received scrolling command. For example, the nature of a scrolling gesture may be used to calculate a scrolling speed and duration and determine the items that will appear in the first display 204 during implementation the scrolling operation. In this embodiment, once the viewable items are identified, the first electronic device 102 sends the associated content for these viewable items to the second electronic device for pre-caching (if that associated content has not already been sent for pre-caching). The received associated content is then cached by the second electronic device 104, for example, within the preview cache 330. Accordingly, the associated content is readily retrievable and displayable as a preview by the second electronic device 104 during the scrolling operation.

It will be appreciated that the scrolling speed may be varied in which case the scrolling speed may be below the pre-determined threshold in some instances, and above the pre-determined threshold in other instances. In such cases, as mentioned above, when the scrolling speed is below the pre-determined threshold, the first electronic device 102 may send the associated content for some of the scrollable list of items to the second electronic device 104 for pre-caching. The second electronic device 104 then displays previews of the received cached content of these scrollable list of items so that they appear synchronized with the scrolled list of items on the first display 204. However, when the scrolling speed is above the pre-determined threshold, the second electronic device 104 may display "blanks" that are correspondingly scrolled on the second display 104 to provide the effect of synchronized scrolling on both displays (the "blank" previews may not actually contain the associated content of the scrolled items on the first display 204). In at least some example embodiments, the transition between the "blank" previews (when the scrolling speed is above the pre-determined threshold which may be referred to as a "fast" scrolling speed) and the "actual" previews (when the scrolling speed is below the pre-determined threshold which may be referred to as a "slow" scrolling speed), and vice versa, may be a gradual transition and not an abrupt transition. For example, when the scrolling speed is changed from a fast scrolling speed to a slow scrolling speed on the first display 204, the blank previews may gradually transition to actual previews such that the previews are being displayed change from being mostly or semi-transparent and/or out-of-focus and/or blank to gradually being non-transparent and/or in-focus and/or populated with some of the associated content on the second display 304. Similarly, when the scrolling speed is changed from a slow scrolling speed to a fast scrolling speed on the first display 204, the actual previews may gradually (or abruptly) transition to blank previews such that the previews change from being in-focus readable content to being transparent and/or out-of-focus and/or blank on the second display 304. Accordingly, the change in the scroll speed may affect the content, transparency, and/or clarity of the previews being displayed on the second display 304.

In one example, when scrolling the previews may contain the item details displayed on the first display 204. When scrolling ends, the item details being displayed may transition into previews of the associated content for those items. As an example, a list of scrollable message identifiers displayed on the first display 204 that are being scrolled may be synchronized with the scrolling of the same list of message identifiers on the second display 304. When the scrolling stops, the message identifiers being displayed on the second display 304 may transition into previews of the bodies of the messages. That is, the second display may now display the associated messages instead of the message identifiers. In at least some example embodiments, the transition may be a more gradual transition and not an abrupt transition to the associated content.

It will also be appreciated that, in some embodiments, the display of the previews on the second display 304 may overlay other content being displayed on the second display 304. For example, the second display 304 may be in use for another application, such as a game, media presentation (e.g. television or movie viewing), web browser, or other visual application. The previews may not be displayed so as to occupy the entire portion of the second display 304. In some embodiments, the previews may be displayed as partly transparent overlays to the content already being displayed on the second display 304.

In order to further illustrate the sharing of content between the first electronic device 102 and the second electronic device 104, reference will now be made to FIGS. 5 to 8 which show the example first electronic device 102 (of FIGS. 1 and 2) (which, in the example illustrated, is a mobile communication device 201 such as a smartphone), and the example second electronic device 104 (of FIGS. 1 and 3) (which, in the example illustrated, is a tablet computer).

Figure 5:
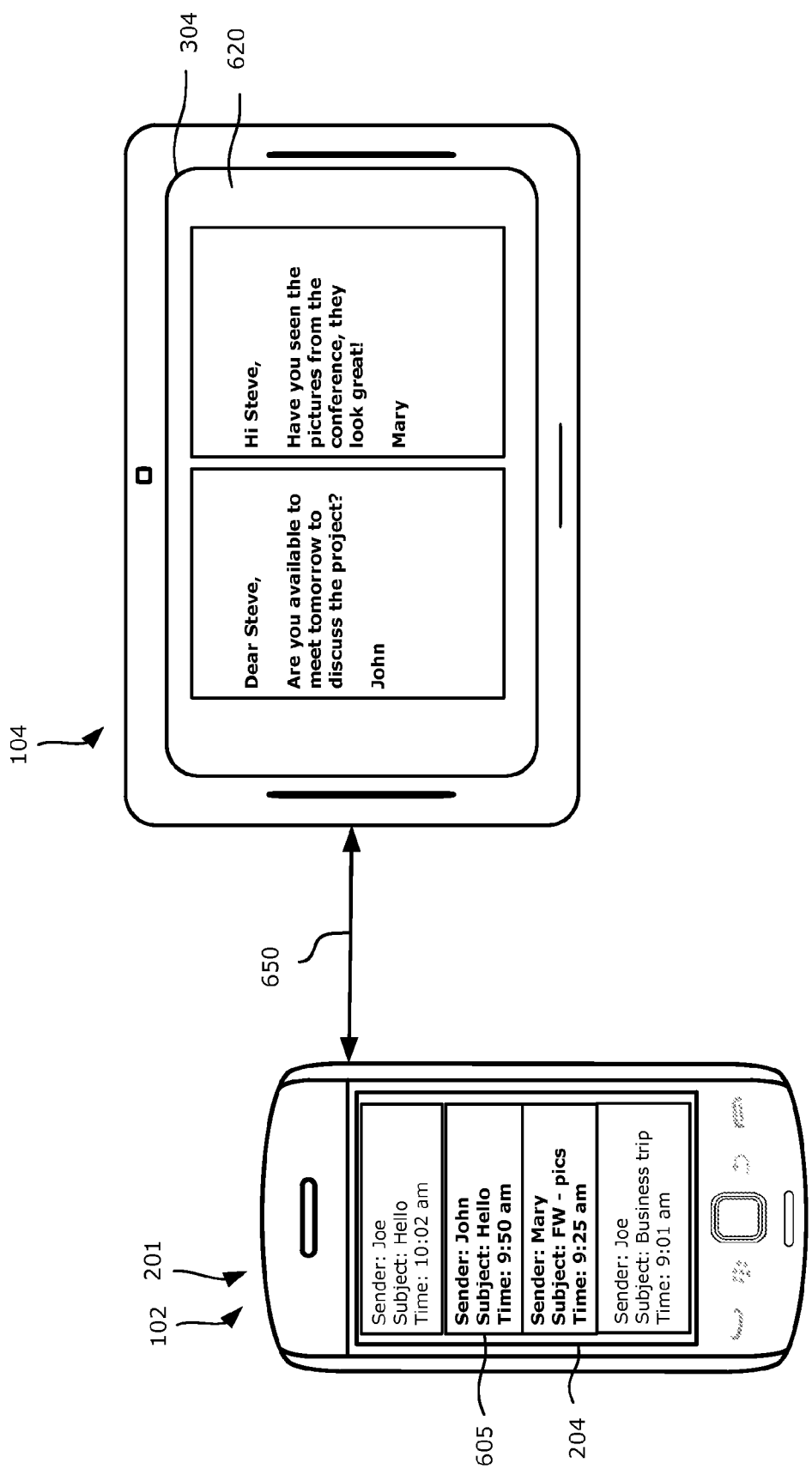
FIG. 5 is an example embodiment of a first electronic device and a second electronic device.

With reference to FIG. 5, the first electronic device 102 is connected to the second electronic device 104 via a communication link 650 (either wirelessly or non-wirelessly as described above).

The first electronic device 102 displays on the first display 204 a list of items 605 with each item of the list having respective associated content that is not displayed with the list of items. More specifically, the list of items 605 are a list of email message identifiers with each email message identifier including a sender name, a subject and a time associated with the email message. While displaying the list of items 605, the first electronic device 102 sends the content associated with one or more of the items to the second electronic device 104 for display on the second display 304 as previews 620. That is, the second electronic device 104 receives the associated content and displays previews 620 of the associated content on the second display 304. More particularly, the first electronic device 102 sends the associated content for each of the second and third email message identifiers, which are illustrated graphically bolded, to the second electronic device 104. The associated content is a body of the email message. The second electronic device 104 displays a preview of the body of the email message corresponding to each of the second and third email message identifiers.

In this example, the previews shown include the bodies of the emails. In other examples, the previews may include a portion of the bodies of the emails. In yet other examples, the previews may include header information, such as subject, sender, date, etc.

In this example, only two previews are shown. It will be appreciated that in other embodiments, one preview or three or more previews may be shown, depending on the design of the graphical interface on the second electronic device 104. In one example, a series of horizontal previews is shown with one or more central previews of the series "zoomed-in" to reveal additional content or detail, whereas the other previews of the series may be shown "zoomed-out" with little or no detail regarding the associated content of those previews being rendered.

Figure 6:
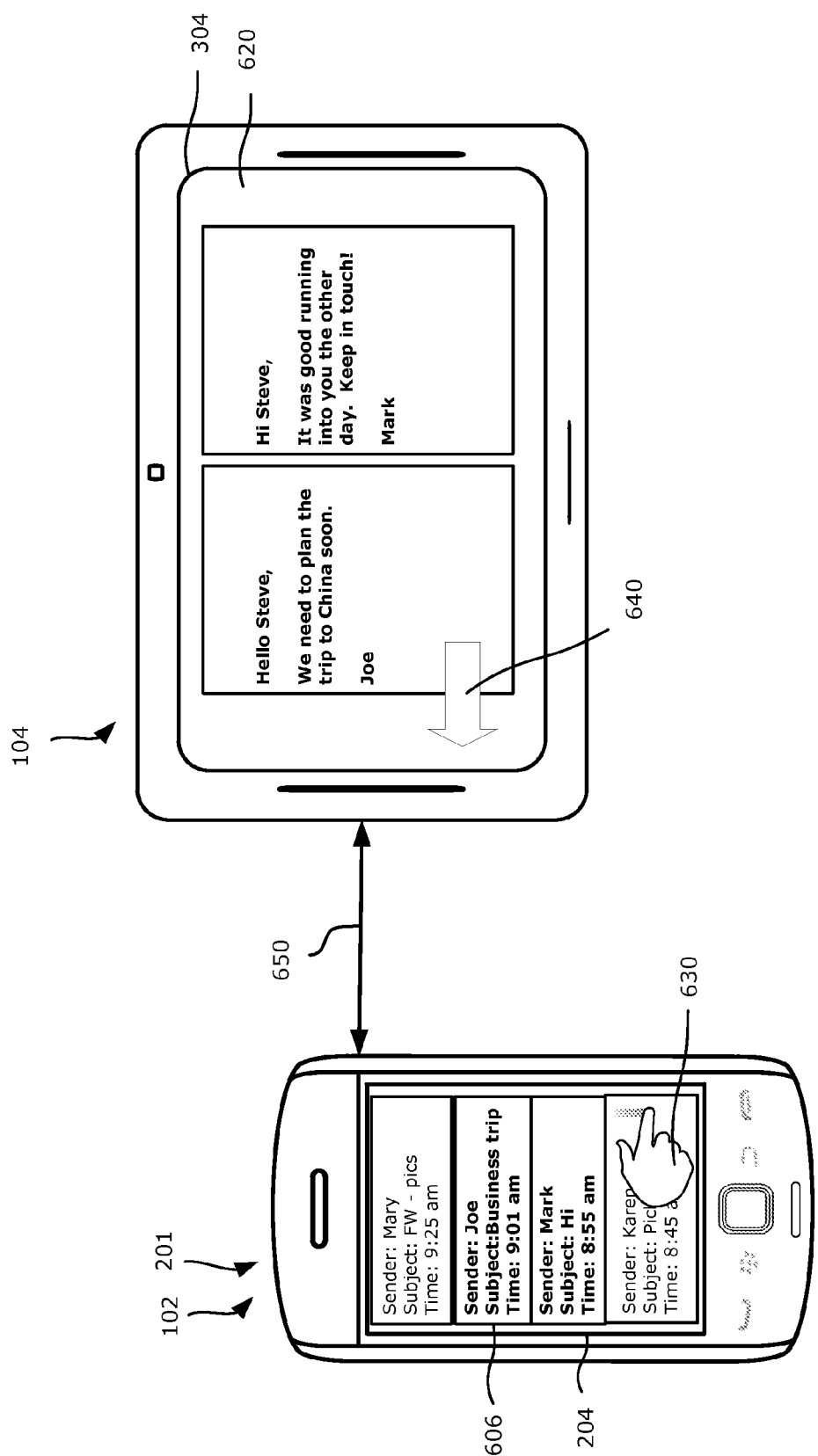
FIG. 6 is a further example embodiment of the first electronic device and the second electronic device.

With reference to FIG. 6, the list of items 605 (of FIG. 5) is a subset of a scrollable list of items 606 that are displayed on the first display 204 by the first electronic device 102. The first electronic device 102 receives a scrolling command to scroll the scrollable list of items. More particularly, a user inputs a scrolling gesture 630 (e.g. an upwards swipe on a touchscreen) to scroll the scrollable list of items 606. In response to receiving the scrolling command, the first electronic device 102 scrolls the scrollable list of items up to no longer display some items and to display other items that were not previously displayed (when compared to FIG. 5). For example, the item "Business Trip" that appears at the bottom of the displayed list in FIG. 5 is now second-from-the-top in the list displayed in FIG. 6.

While scrolling the scrollable list of items, the first electronic device 102 initiates scrolling of the corresponding previews 620 on the second display 304. That is, the previews 620 displayed on the second display 304 are simultaneously scrolled based on the scrolling gesture 630 performed on the first display 204. As shown, the previews 620 are scrolled in a leftward direction 640 to display previews 620 of the body of the email message that correspond to the new second and third email message identifiers (which are illustrated as graphically bolded).

Figure 7:
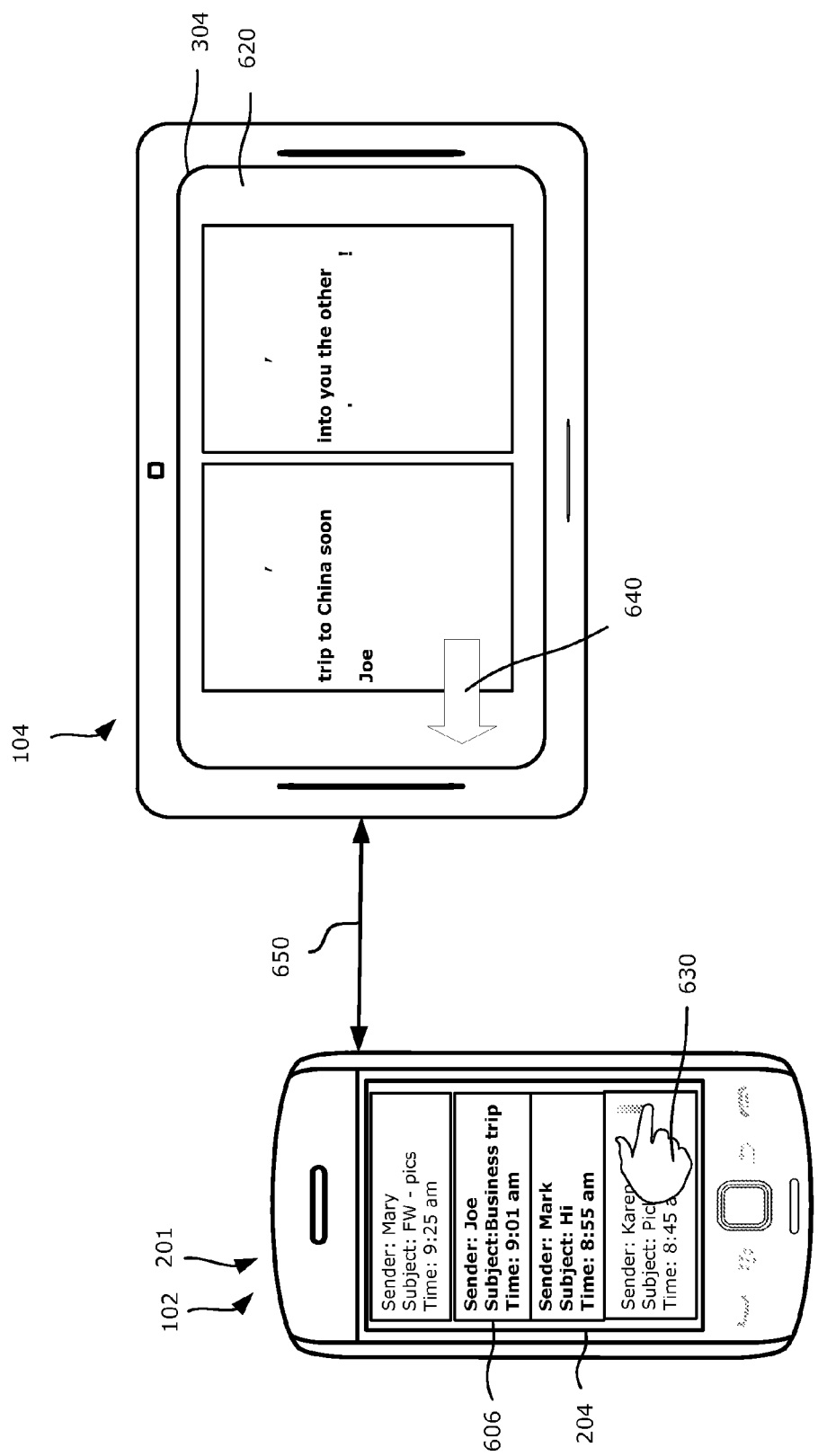
FIG. 7 is another example embodiment of the first electronic device and the second electronic device.
Figure 8:
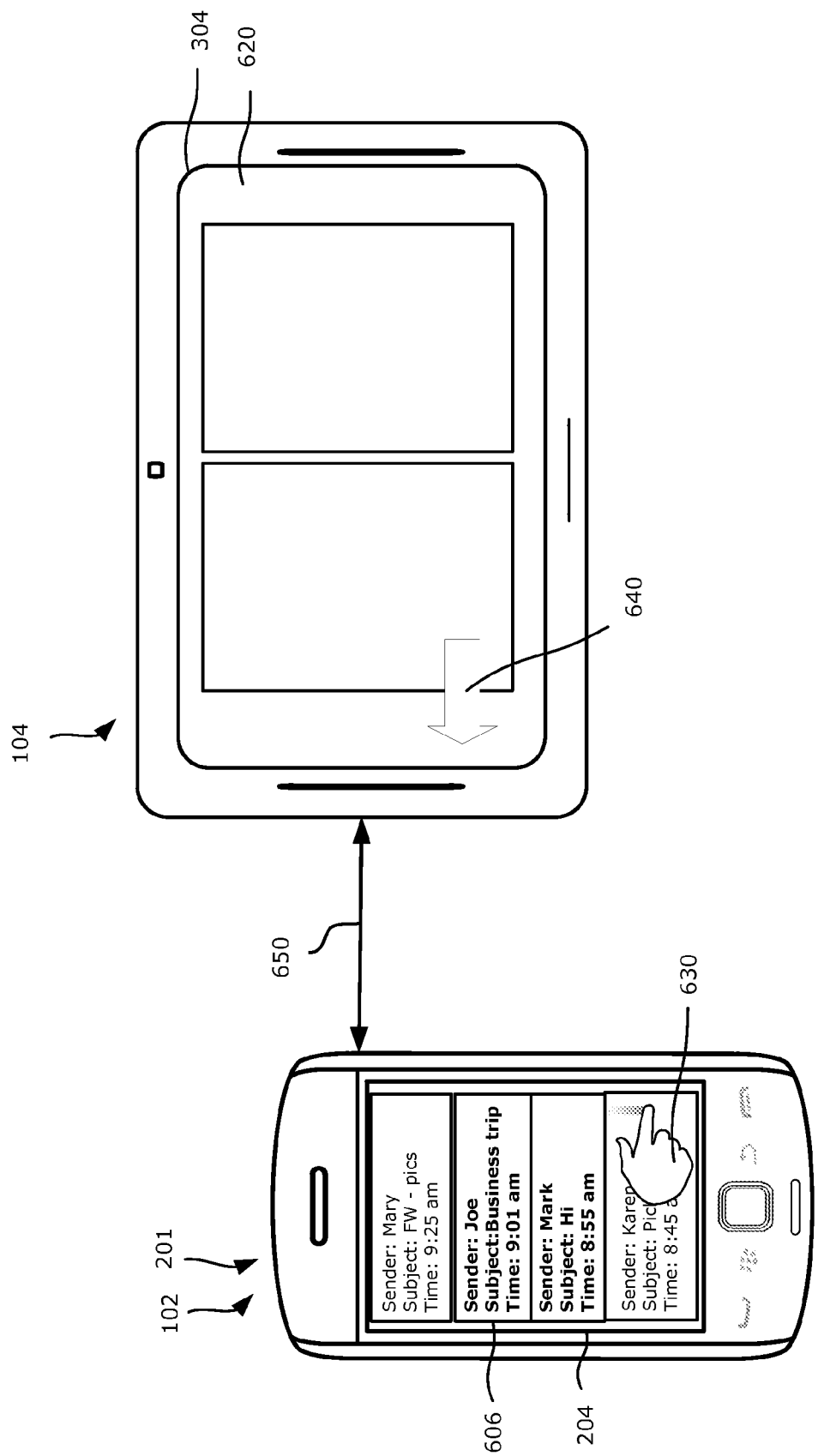
FIG. 8 is a yet further example embodiment of the first electronic device and the second electronic device.

Reference is now made to FIGS. 7 and 8, which illustrate an example embodiment of the effects of changes in the scrolling speed of the scrollable list of items 606 to the transparency in the display of the previews 620 on the second display 304. As mentioned above, in at least some example embodiments, the previews may gradually transition from being mostly or wholly transparent and/or blank (when the scrolling speed is above a pre-determined threshold) to being semi or non-transparent and/or filled with associated content (when the scrolling speed slows or is stopped). Accordingly, in an embodiment illustrated in FIG. 7, the scrollable list of items 606 is scrolled such that the previews 620 shown on the second display 304 are rendered more transparent and/or out-of-focus. In the embodiment shown in FIG. 8, the previews 620 being scrolled are shown to be displayed as 'blank' previews on the second display 304. The scrolling speed may determine whether the previews 620 are displayed blank, semi-transparent, or non-transparent. In some cases, the transition between a blank preview during scrolling and a non-transparent preview may be a gradual one based on the amount of time elapsed since the scrolling ended and while the first display 204 continues to display the list of items.

It will also be understood from the foregoing description that the previews 620 may be made wholly transparent during scrolling of the list of items on the first device 201. That is, when the list is being scrolled, no previews are shown on the second display 304. Once scrolling of the list ends, the first electronic device 102 may then identify the items visible on the first display 204 and may instruct the second electronic device 104 to display previews for those items. The display of the previews may be gradual, with the previews starting as a transparent overlay and gradually being made non-transparent, in some embodiments. The previews may also be gradually 'grown' on the second display 340, meaning they start as small size previews and grow into larger easier-to-read previews the longer the list on the first display is left in place without further scrolling. Initiating new scrolling may, in some embodiments, cause removal of the previews from the second display 304. In this manner, the previews grown gradually more details and/or visible on the second display 304 the longer that the identified items are left visible on the first display 204 without being further scrolled.

While the present application is primarily described in terms of methods, a person of ordinary skill in the art will understand that the present application is also directed to various apparatus such as the first electronic device 102 and the second electronic device 104. The electronic devices include components for performing at least some of the example aspects and features of the described methods, be it by way of hardware components (such as the memory and/or the processor), software or any combination of the two, or in any other manner. Moreover, an article of manufacture for use with the apparatus, such as a pre-recorded storage device or other similar computer readable medium including program instructions recorded thereon may direct an apparatus to facilitate the practice of the described methods. It is understood that such apparatus and articles of manufacture come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A method in an electronic device, the electronic device having a first display, the method comprising:
   displaying a list of items on the first display, wherein the list of items is a subset of a scrollable list of items, the items having respective associated content not visible in the displayed list of items;
   while displaying the list of items on the first display, sending the associated content for a plurality of the items to a second display that forms part of another electronic device, for display on the second display as previews of that associated content; and
   receiving, at the electronic device, a scrolling command to scroll the scrollable list of items and, in response,
     scrolling the scrollable list of items on the first display, and
     while scrolling the scrollable list of items on the first display, simultaneously causing a corresponding scrolling of the corresponding previews of the associated content on the second display by:
       identifying a set of the items visible on the first display as a result of the scrolling,
       determining whether the associated content for the set of items has been sent to the second display and transmitting the associated content for the set of items to the second display when the associated content is determined not to have been sent to the second display, and
       transmitting information regarding the scrolling command to the second display to cause the corresponding scrolling, wherein the corresponding scrolling comprises causing smooth graphical movement of a displayed series of the corresponding previews,
       and wherein, when the information regarding the scrolling command indicates an increase in scrolling speed, the smooth graphical movement causes transition from display of the corresponding previews to display of blank graphical images in place of the corresponding previews.

2. The method of claim 1, further comprising displaying on the second display one or more previews, each preview displaying respective associated content received from the electronic device.

3. The method of claim 2, wherein displaying a list of items on the first display and displaying on the second display includes applying a graphical feature to one of the items and its associated preview to indicate the association between that item and its associated preview.

4. The method of claim 2, wherein displaying on the second display is not conditional upon receipt of a selection of items on the first display corresponding to the one or more previews.

5. The method of claim 1, wherein the method further comprising establishing a connection with the another electronic device.

6. The method of claim 5, further comprising sending, to the another electronic device for pre-caching, associated content for some of the items from the scrollable list of items not yet displayed in the first display.

7. The method of claim 1, wherein the simultaneously causing a corresponding scrolling is not conditional on user selection of the one or more of the items.

8. The method of claim 1, wherein the list of items is associated with a messaging application, each item of the list of items is a message identifier, and the content associated with each item is a body of a message.

9. The method claimed in claim 1, wherein displaying on the first display includes applying a graphical indicator to each item in the set of items on the first display, and wherein sending includes sending information for applying a corresponding graphical indicator to each respective item in the corresponding sequence of previews to graphically link each item on the first display with its corresponding preview on the second display.

10. The method claimed in claim 1, wherein displaying the list of items includes displaying a portion of each of the items, and wherein the associated content comprises an additional portion of each of the items.

11. The method claimed in claim 10, wherein the items comprise messages, and wherein the portion of each of the items includes header information and the associated content comprises the bodies of the messages.

12. The method claimed in claim 10, wherein the items comprise images, and wherein the portion of each of the items includes a thumbnail and the associated content comprises a higher-resolution version of the image.

13. The method claimed in claim 1, wherein transmitting information comprises transmitting information identifying the set of the items visible on the first display as a result of the scrolling.

14. An electronic device comprising:
a first display;
a processor coupled to the first display;
and wherein the electronic device is configured to:
  display a list of items on the first display, wherein the list of items is a subset of a scrollable list of items, the items having respective associated content not visible in the displayed list of items;
  while displaying the list of items on the first display, send the associated content for a plurality of the items to a second display for display on the second display as previews of that associated content; and
  receive, at the electronic device, a scrolling command to scroll the scrollable list of items and, in response, scroll the scrollable list of items on the first display, and
  while scrolling the scrollable list of items on the first display, simultaneously causing corresponding scrolling of the corresponding previews of the associated content on the second display by:
    identifying a set of the items visible on the first display as a result of the scrolling,
    determining whether the associated content for the set of items has been sent to the second display and transmitting the associated content for the set of items to the second display when the associated content is determined not to have been sent to the second display, and
    transmitting information regarding the scrolling command to the second display to cause the corresponding scrolling, wherein the corresponding scrolling comprises causing smooth graphical movement of a displayed series of the corresponding previews,
    and wherein, when the information regarding the scrolling command indicates an increase in scrolling speed, the smooth graphical movement causes transition from display of the corresponding previews to display of blank graphical images in place of the corresponding previews.

15. The electronic device claimed in claim 14, wherein the simultaneously causing a corresponding scrolling is not conditional on user selection of the one or more of the items.

16. A non-transitory computer-readable storage medium comprising computer executable instructions which, when executed, configure a processor to:
  display a list of items on a first display of an electronic device, wherein the list of items is a subset of a scrollable list of items, the items having respective associated content not visible in the displayed list of items;
  while displaying the list of items on the first display, send the associated content for a plurality of the items to a second display for display on the second display as previews of that associated content; and
  receiving, at the electronic device, a scrolling command to scroll the scrollable list of items and, in response, scrolling the scrollable list of items on the first display, and
  while scrolling the scrollable list of items on the first display, simultaneous causing corresponding scrolling of the corresponding previews of the associated content on the second display by:
    identifying a set of the items visible on the first display as a result of the scrolling,
    determining whether the associated content for the set of items has been sent to the second display and transmitting the associated content for the set of items to the second display when the associated content is determined not to have been sent to the second display, and
    transmitting information regarding the scrolling command to the second display to cause the corresponding scrolling, wherein the corresponding scrolling comprises causing smooth graphical movement of a displayed series of the corresponding previews,
    and wherein, when the information regarding the scrolling command indicates an increase in scrolling speed, the smooth graphical movement causes transition from display of the corresponding previews to display of blank graphical images in place of the corresponding previews.

* * * * *